(12) United States Patent
Godshall et al.

(10) Patent No.: US 11,887,079 B2
(45) Date of Patent: Jan. 30, 2024

(54) CENTRAL HUB RECONCILIATION SYSTEM AND METHOD

(71) Applicant: Visa International Service Association, San Francisco, CA (US)

(72) Inventors: Alexander Godshall, Miami, FL (US); Ximena Bellido Hoefken, Mountain View, CA (US); Juliette Metzger, New York, NY (US); Khyati Shah, Mountain View, CA (US); Saurabh Chopra, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 9 days.

(21) Appl. No.: 17/196,849

(22) Filed: Mar. 9, 2021

(65) Prior Publication Data

US 2021/0279698 A1    Sep. 9, 2021

Related U.S. Application Data

(60) Provisional application No. 62/987,117, filed on Mar. 9, 2020.

(51) Int. Cl.
*G06Q 20/10* (2012.01)
*G06Q 20/38* (2012.01)
*G06Q 20/40* (2012.01)

(52) U.S. Cl.
CPC ....... *G06Q 20/102* (2013.01); *G06Q 20/3821* (2013.01); *G06Q 20/401* (2013.01)

(58) Field of Classification Search
CPC . G06Q 20/102; G06Q 20/3821; G06Q 20/401
See application file for complete search history.

(56) References Cited

U.S. PATENT DOCUMENTS

| 4,180,854 A | * | 12/1979 | Walden | G06F 15/02 |
| | | | | 708/130 |
| 7,035,856 B1 | * | 4/2006 | Morimoto | B65D 23/14 |
| | | | | 707/999.01 |

(Continued)

FOREIGN PATENT DOCUMENTS

| WO | WO-2008042846 A1 * | 4/2008 | ......... G06F 21/6218 |
| WO | WO-2009105339 A2 * | 8/2009 | ............. G06Q 10/10 |

OTHER PUBLICATIONS

"Automated Clearing House Services NACHA File Format Specifications", Mar. 15, 2013. Available at: https://files.nc.gov/ncosc/documents/eCommerce/bank_of_america_nacha_file_specs.pdf (Year: 2013).*

(Continued)

*Primary Examiner* — David P Sharvin
*Assistant Examiner* — Gregory Harper
(74) *Attorney, Agent, or Firm* — Kilpatrick Townsend & Stockton LLP

(57) ABSTRACT

A method and system for central hub reconciliation is disclosed. The central hub reconciliation can provide for improved methods of reconciliation between a buyer (e.g., a request realization party) and a supplier (e.g., a request originating party). A central hub server may receive a data file comprising remittance data and payment data from a request realization computer. The remittance data is associated with a request provided from a request originating computer to the request realization computer. The central hub server ay then generate a unique identifier for the data file, and provide the payment data and the unique identifier to an authorizing entity computer requesting payment on behalf of the request realization computer. The central hub provides the remittance data and the unique identifier to the request originating computer which updates a repository (Continued)

using the payment data and the remittance data upon finding a match.

9 Claims, 9 Drawing Sheets

(56) References Cited

U.S. PATENT DOCUMENTS

| | | | | |
|---|---|---|---|---|
| 8,165,934 | B2* | 4/2012 | Manista | G06Q 40/12 |
| | | | | 705/30 |
| 9,591,066 | B1* | 3/2017 | Katyal | H04L 67/1097 |
| 9,792,611 | B2* | 10/2017 | Hammad | G06F 21/34 |
| 10,311,412 | B1* | 6/2019 | Josephs | G06Q 20/023 |
| 10,373,152 | B2* | 8/2019 | Makhotin | H04W 4/80 |
| 10,410,191 | B2* | 9/2019 | Ceribelli | G06Q 20/042 |
| 10,740,731 | B2* | 8/2020 | Basu | G06Q 20/023 |
| 10,949,815 | B2* | 3/2021 | Makhotin | G06Q 20/02 |
| 11,087,296 | B1* | 8/2021 | Blacher | G06Q 20/023 |
| 11,170,379 | B2* | 11/2021 | Cash | G06Q 20/3821 |
| 2003/0163418 | A1 | 8/2003 | Marks | |
| 2004/0064375 | A1* | 4/2004 | Randell | G06Q 40/02 |
| | | | | 705/30 |
| 2006/0287953 | A1 | 12/2006 | Chauhan | |
| 2007/0241179 | A1* | 10/2007 | Davis | G06Q 20/40 |
| | | | | 705/45 |
| 2009/0112661 | A1* | 4/2009 | Mullen | G06Q 20/04 |
| | | | | 705/35 |
| 2010/0306092 | A1* | 12/2010 | Wilkes | G06Q 20/40 |
| | | | | 705/37 |
| 2011/0119178 | A1* | 5/2011 | Clayton | G06Q 20/10 |
| | | | | 705/39 |
| 2011/0119188 | A1* | 5/2011 | Clayton | G06Q 40/02 |
| | | | | 705/44 |
| 2011/0119189 | A1* | 5/2011 | Clayton | G06Q 20/40 |
| | | | | 705/44 |
| 2013/0339187 | A1* | 12/2013 | Carter | G06Q 20/102 |
| | | | | 705/26.41 |
| 2014/0122264 | A1* | 5/2014 | Gebhart | G06Q 40/10 |
| | | | | 705/16 |
| 2014/0136405 | A1* | 5/2014 | DuCharme | G06Q 20/10 |
| | | | | 705/40 |
| 2014/0195416 | A1* | 7/2014 | Linscott | G06Q 20/023 |
| | | | | 705/39 |
| 2014/0222669 | A1 | 8/2014 | Novak et al. | |
| 2014/0310177 | A1* | 10/2014 | Eliscu | G06Q 20/0425 |
| | | | | 705/44 |
| 2015/0012382 | A1* | 1/2015 | Ceribelli | G06Q 50/01 |
| | | | | 705/26.35 |
| 2015/0142643 | A1* | 5/2015 | Ceribelli | G06Q 30/04 |
| | | | | 705/39 |
| 2015/0227933 | A1* | 8/2015 | Serebrennikov | H04L 67/10 |
| | | | | 705/44 |
| 2015/0332228 | A1* | 11/2015 | Kimberg | G06Q 20/108 |
| | | | | 705/40 |
| 2015/0356690 | A1* | 12/2015 | Celikyilmaz | G06Q 40/12 |
| | | | | 705/30 |
| 2017/0161696 | A1 | 6/2017 | Hattar et al. | |
| 2017/0270493 | A1* | 9/2017 | Lugli | G06Q 20/027 |
| 2017/0364873 | A1* | 12/2017 | Turk | G06Q 20/102 |
| 2018/0114224 | A1* | 4/2018 | Newland | H04L 63/0853 |
| 2018/0322489 | A1* | 11/2018 | Altenhofen | G06Q 20/40 |
| 2018/0357585 | A1* | 12/2018 | Torkian | G06Q 10/06315 |
| 2019/0034421 | A1* | 1/2019 | Teshima | G06F 16/23 |
| 2019/0095968 | A1* | 3/2019 | Ceribelli | G06Q 50/01 |
| 2019/0122222 | A1* | 4/2019 | Uechi | G06Q 20/42 |
| 2019/0188762 | A1* | 6/2019 | Teshima | G06Q 20/14 |
| 2019/0289019 | A1* | 9/2019 | Thekadath | G06F 16/27 |
| 2019/0303890 | A1* | 10/2019 | Frohwein | G06F 40/174 |
| 2020/0279235 | A1* | 9/2020 | Booth | G06Q 20/409 |
| 2020/0387976 | A1* | 12/2020 | Bull | G06N 3/08 |
| 2021/0150493 | A1* | 5/2021 | Teshima | G06Q 20/14 |
| 2022/0044218 | A1* | 2/2022 | Maeng | G06Q 20/405 |
| 2022/0092560 | A1* | 3/2022 | Malparty | G06Q 20/027 |

OTHER PUBLICATIONS

"What is CFDI ?—Understanding CFDI Compliance", Nov. 1, 2018. Available at: https://tipalti.com/cfdi-compliance/ (Year: 2018).*

* cited by examiner

CENTRAL HUB RECONCILIATION SYSTEM AND METHOD

CROSS-REFERENCES TO RELATED APPLICATIONS

This application is a non-provisional and claims the benefit of U.S. Provisional Application No. 62/987,117, filed on Mar. 9, 2020 and entitled "Central Hub Reconciliation System and Method", the disclosure of which is herein incorporated by reference in its entirety for all purposes.

BACKGROUND

Currently, reconciliation between two entities can be performed by a first party (e.g., a supplier) requesting a second party (e.g., a buyer) to provide payment for a previously provided product or service. The first party may have generated and stored an invoice pertaining to the good or service previously provided. The first party can then send a message comprising the invoice to the second party. To respond to the invoice with a payment, the second party can initiate a payment transfer to the first party via their associated banks (e.g., a first bank associated with the first party, a second bank associated with the second party). The second bank may complete the payment transfer (e.g., via an ACH payment) and after completion, the first bank may notify the first party with a message comprising payment details. Separately, the second party can send a message (e.g., via email) comprising remittance data back to the first party indicating that the payment has been submitted to the associated banks. Upon receiving both the message comprising the payment details from their bank and the message comprising remittance data, the first party then needs to manually match the message received from their bank and the message received from the second party. This process is inefficient and has many potential failure points, some of which is highlighted below.

Payments may be completed through many different methods such as ACH (Automatic Clearing House), RTP (Real Time Payments), virtual card payments, SWIFT, etc. In many conventional systems, the payment transfer is completed as an ACH payment. Each supplier of a good or service may define an ACH transfer format that they would like to receive. The format of the payment data included in the ACH transfer may be unique to each supplier, meaning a buyer must adapt to fit the format defined by each supplier they interact with. Further, the payment data formats commonly used in any of the above mentioned payment methods do not contain enough fields to combine the payment data with the complete remittance data. Thus, the payment data and remittance data cannot be easily combined, and there exists a risk of misplacing the messages and not being able to successfully link them together.

Embodiments of the disclosure address this problem and other problems individually and collectively.

SUMMARY

One embodiment is related to a method comprising: receiving, by a server computer, a data file comprising remittance data and payment data from a request realization computer, the remittance data associated with a request provided from a request originating computer to the request realization computer; generating, by the server computer, a unique identifier for the data file; providing, by the server computer, the payment data and the unique identifier to an authorizing entity computer requesting payment on behalf of the request realization computer, wherein the authorizing entity computer, upon authorizing the request associated with the payment data, provides payment data and the unique identifier to the request originating computer; and providing, by the server computer, the remittance data and the unique identifier to the request originating computer, wherein the request originating computer compares the unique identifier received from the authorizing entity computer and the unique identifier received from the server computer and updates a repository using the payment data and the remittance data upon finding a match.

Another embodiment is related to a server computer comprising: a processor; and a computer readable medium coupled to the processor, the computer readable medium comprising code that, when executed by the processor implements the above method.

A better understanding of the nature and advantages of embodiments may be gained with reference to the following detailed description and accompanying drawings.

DETAILED DESCRIPTION

Figure 1:
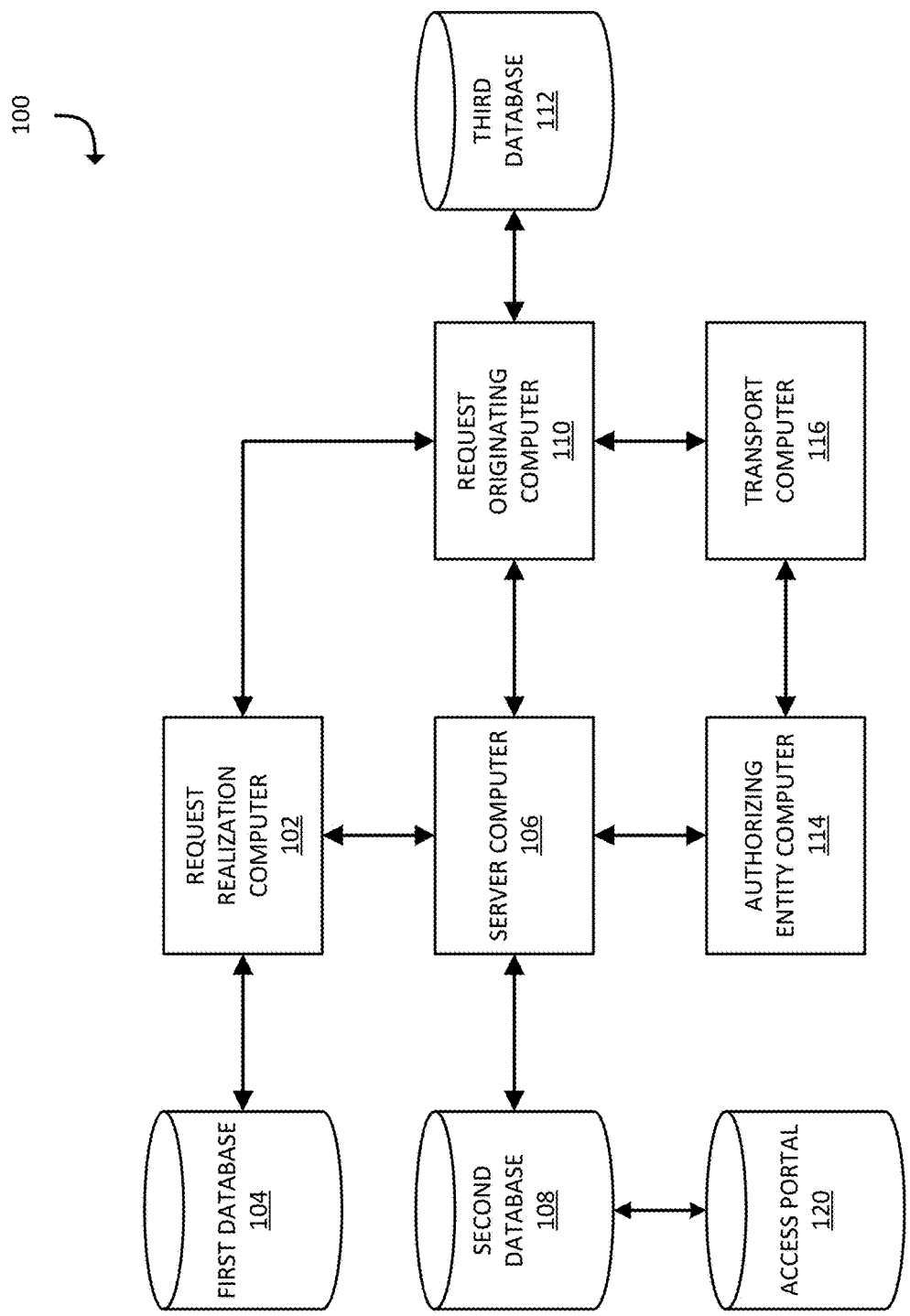
FIG. 1 shows a block diagram of a central hub system according to embodiments.

Prior to discussing embodiments of the disclosure, some terms can be described in further detail.

A "data file" can include a computer file that stores data to be used by a computer application or system. A data file can be stored in various manners (e.g., a text file, a binary file, etc.). In some embodiments, a data file can include payment data and remittance data for one or more requests.

"Payment data" can include data relating to a payment from one entity to another entity and/or payment processing. Payment data can include receiving bank account information, sending bank account information, amounts, dates, times, etc.

"Request data" or "remittance data" can include data relating to a request made from one entity to another entity. For example, a request can be an invoice. A first entity can send an invoice to a second entity for a product and/or service provided by the first entity. The remittance data can comprise data relating to the request, for example, a request number, a subject of the request, etc. In some embodiments, the request can be an invoice and the remittance data can be invoice data comprising an invoice number, an invoice amount, a buyer name, a short pay reason, a supplier bank information, and/or any other data that facilitates in describing the invoice.

A "unique identifier" can include an identifier that may be guaranteed to be unique among all identifiers used for associated objects and for a specific purpose. A unique identifier may uniquely identify a data file, remittance data, and/or payment data. In some embodiments, a unique identifier may comprise any alphanumeric characters or symbols.

An "interaction" may include a reciprocal action or influence. An interaction can include a communication, contact, or exchange between parties, devices, and/or entities. Example interactions include a transaction between two parties or a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

"Validation" and its derivatives may refer to a process that utilizes information to determine whether an underlying subject is valid under a given set of circumstances. Validation may include any comparison of information to ensure some data or information is correct, valid, accurate, legitimate, and/or in good standing.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments may allow for linkage between remittance data (e.g., remittance data may be request data received from an invoice) and payment data between a plurality of entities and associated computers. Embodiments can provide for a mechanism to link remittance data to payment data. Remittance data and payment data can be generated together by a request realization computer and provided to a server computer to realize a request (e.g., an invoice). A server computer can then generate a unique identifier to link the remittance data and the payment data throughout the process. The server computer can provide for format standardization, reformatting of data, data validation, generation of unique IDs, and/or data sharing.

In some embodiments, a process can start with a request realization computer (e.g., operated by a payer/buyer) generating payment data and remittance data for each transaction they want to process. This information can be included in one data file and can follow a standard as defined by a server computer, as recipient of the information. The file can be sent to the server computer through an API or through file-based integration. The server computer can collect the information and validate both the format and integrity of the received data. In some embodiments, the server computer can store the received data file that comprises payment data and remittance data for any suitable predetermined amount of time (e.g., 27 months, etc.). The server computer can create a unique ID for each transaction that links the remittance data to the payment data. According to various embodiments, a unique ID may be assigned to a set of transactions processed together (e.g., a cluster of related transactions). The server computer can then share any relevant data with any of the other entities, for example, a request realization computer, a request originating computer, an authorizing entity computer, etc.

According to various embodiments, the server computer may validate the received data, and send a standard format file with unique ID related to each transaction and errors identified during the validation to the request realization computer (e.g., accounts payable). If no errors are identified during the validation process, the server computer can send a standard format file that includes the remittance data and the unique ID related to the payment data to the request originating computer (e.g., accounts receivable). The server computer can initiate the payment by sending a payment information file (PIF) that includes unique ID in a message field to the authorizing entity computer.

The request originating computer can receive remittance data and a unique ID from the server computer and can store the unique ID and remittance data until a payment is posted, for a predetermined amount of time after the payment is posted, or indefinitely. The request realization computer can receive an alert from the authorizing entity when the payment is cleared and searches for unique ID in its data base. The request originating computer can run validations to match payment and invoice data.

FIG. 1 shows a block diagram of a central hub system 100 according to embodiments. The central hub system 100 comprises a request realization computer 102, a first database 104, a server computer 106, a second database 108, a request originating computer 110, a third database 112, an authorizing entity computer 114, and a transport computer 116. The request realization computer 102 can be in operative communication with the first database 104 and the server computer 106. In some embodiments, the request realization computer 102 can be in operative communication with the request originating computer 110. The server computer 106 can be in operative communication with the request realization computer 102, the request originating computer 110, and the authorizing entity computer 114. The request originating computer 110 can be in operative communication with the third database 112 and the transport computer 116. The transport computer 116 can be in operative communication with the request originating computer 110 and the authorizing entity computer 114.

For simplicity of illustration, a certain number of components are shown in FIG. 1. It is understood, however, that embodiments may include more than one of each component. In addition, some embodiments may include fewer than or greater than all of the components shown in FIG. 1.

Messages between at least the computers in FIG. 1 can be transmitted using a secure communications protocols such as, but not limited to, File Transfer Protocol (FTP); Hyper-Text Transfer Protocol (HTTP); Secure Hypertext Transfer Protocol (HTTPS), SSL, ISO (e.g., ISO 8583) and/or the like. A communication network used may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The request originating computer 110 may comprise a computer that generates requests (e.g., a request for payment such as an invoice). The request originating computer 110 can provide the request to the request realization computer 102. For example, the request originating computer 110 can transmit an invoice to the request realization computer 102 regarding one or more products and/or services provided by an entity of the request originating computer 110 (e.g., a supplier) to an entity of the request realization computer 102 (e.g., a buyer).

The request realization computer 102 may comprise a computer that responds to requests. The request realization computer 102 can receive a request from the request originating computer 110 and generate payment data and remittance data (e.g., invoice data) relating to the request received. In some embodiments, the remittance data can include one or more data elements received in the request (e.g., an invoice number, an invoice amount, a buyer identifier, a supplier name, etc.). The request realization computer 102 can then generate a data file comprising the remittance data and the payment data and provide the data file to the server computer 106. The data file comprising the remittance data and the payment data may then be stored (e.g., in a first database 104) by the request realization computer 102.

The server computer 106 may comprise a central hub that may comprise of one or more computers and/or server computers. The server computer 106 can be configured to receive the data file from the request realization computer 102 via an API, file-base integration, or any other suitable communication channel. The server computer 106 can perform any suitable processing of the received data file. For example, the server computer 106 can validate the payment data and/or the remittance data of the data file, store the payment data and/or the remittance data according to a predetermined data structure (e.g., in a second database 108), split the payment data and the remittance data from the one data file into a plurality of data files, and/or any other suitable processing of the data file. The server computer 106 can generate a unique identifier to be associated with the received data file. For example, the server computer 106 may generate the unique identifier using any suitable random and/or pseudo-random number generators. In other embodiments, the server computer 106 can select a unique identifier to be associated with the received data file from a plurality of unique identifiers from a unique identifier database. In yet other embodiments, the server computer 106 can incrementally assign unique identifiers to incoming data files. The data file including the remittance data and the payment data may be stored at the second database 108 as being associated with the unique identifier.

In some embodiments, the server computer 106 may establish and maintain an access portal 120. The access portal 120 may be in operative communication with the second database 108 to access payment data and remittance data stored at the second database 108. The access portal 120 may provide access to the payment data and remittance data to an entity (e.g., the request realization computer 102, the request originating computer 110, the authorizing entity computer 114 or the server computer 106). A unique identifier may be received from an entity (e.g., the request realization computer 102, the request originating computer 110) to access to the payment data and remittance data associated with that particular unique identifier. The entity may only access the data associated with the unique identifier, and the rest of the data stored at the database 108 may be blocked from access. According to various embodiments, access to the payment data and remittance data may require the entity be associated with the data (e.g., the entity requesting access to the data may be a buyer, associated with the request realization computer, which may be named in the payment data and/or remittance data).

The server computer 106 can then transmit the unique identifier to the request realization computer 102. The server computer 106 may also transmit a list of one or more errors, determined when validating the received data file and/or storing the data file, to the request realization computer 102. As a response to the list of one or more errors, the server computer 106 may receive an updated data file from the request realization computer 102. The server computer 106 may then validate the updated payment data and/or the updated remittance data. If no errors are then found in the updated data, the server computer 106 may proceed with further processing.

The server computer 106 can transmit the unique identifier and the remittance data (e.g., request data received from an invoice) of the data file to the request originating computer 110. The server computer 106 can also transmit the unique identifier and the payment data of the data file to the authorizing entity computer 114.

The authorizing entity computer 114 can be operated by an authorizing entity, which may be an entity that authorizes a request. The authorizing entity computer 114 can determine whether or not to authorize the request. For example, the authorizing entity computer 114, after receiving the payment data, can determine whether or not an account associated with the request realization computer 102 contains sufficient funds to cover an amount included in the payment data. The authorizing entity computer 114 may include a processor and a computer readable medium coupled to the processor, the computer readable medium comprising code, executable by the processor for performing the functions described. The authorizing entity computer 114 may be configured to transmit and receive encrypted data and/or messages to and from the server computer 106, the transport computer 116, etc.

In some embodiments, the authorizing entity computer 114 can authorize a payment to a transport computer 116 (e.g., a computer operated by a supplier bank that maintains an account for a user and/or an entity of the request originating computer 110). The authorizing entity computer 114 can initiate and perform an automated clearing house (ACH) payment, or any other suitable payment processing method. The authorizing entity computer 114 can also provide the unique identifier to the transport computer 116.

In other embodiments, the authorizing entity computer 114 can decline a payment with the payment data and the unique identifier. For example, the authorizing entity computer 114 can decline for any suitable reason, such as inadequate funds in the account associated with the request realization computer 102, or suspicion of fraud. The authorizing entity computer 114 can transmit a response to the server computer 106 comprising any suitable data relating to declining the payment (e.g., a list of errors that occurred in the payment process). The server computer 106 can then notify the request realization computer 102 regarding the authorizing entity computer 114 declining the payment process.

The transport computer 116 can include a computer that may issue and optionally maintain an account for a user and/or an entity of the request originating computer 110. The transport computer 116 may include a processor and a computer readable medium coupled to the processor, the computer readable medium comprising code, executable by the processor for performing the functions described. The transport computer 116 can receive funds from the authorizing entity computer 114. The transport computer 116 can also receive the unique identifier from the authorizing entity computer 114. The transport computer can be configured to provide the unique identifier, and in some embodiments an indication that a payment associated with the payment data has been received, to the request originating computer 110.

In some embodiments, the request originating computer 110 can then determine whether or not the unique identifier received from the server computer matches the unique identifier received from the transport computer 116. The request originating computer 110 can store (e.g., in a third database 112), and/or performing any suitable processing with, the received unique identifier, the payment data, and/or the remittance data.

The first database 104, the second database 108, and the third database 112 can comprise any suitable database. The databases may be conventional, fault tolerant, relational, scalable, secure database. In some embodiments, the first database 104, the second database 108, and/or the third database 112 can include one or more blockchains.

Figure 2:
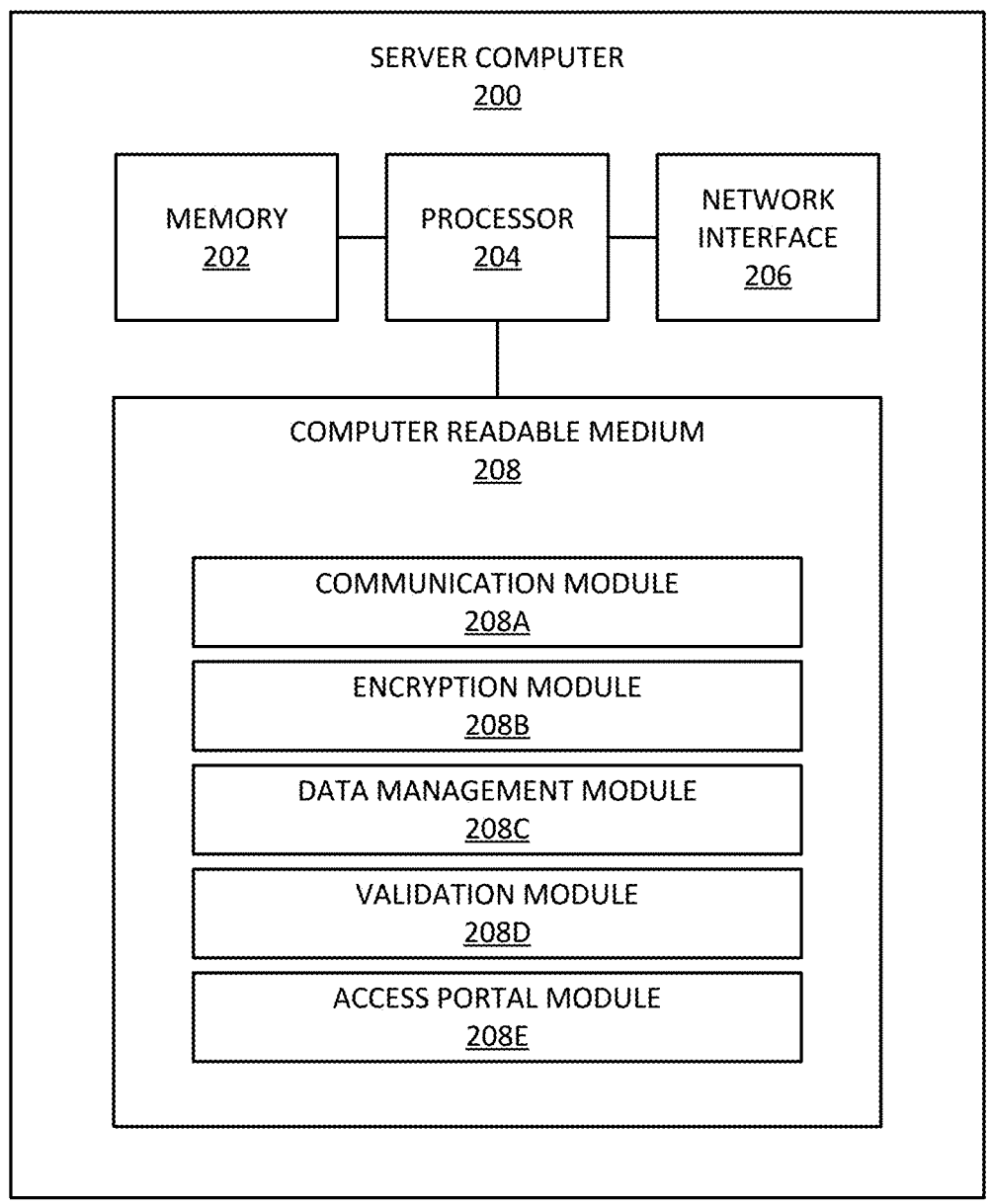
FIG. 2 shows a block diagram of components of a server computer according to embodiments.

FIG. 2 shows a block diagram of components of a server computer 200 according to embodiments. The server computer 200 may comprise a processor 204. The processor 204 may be coupled to a memory 202, a network interface 206, and a computer readable medium 208. The computer readable medium 208 can comprise any suitable number of modules.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store data files comprising remittance data and payment data, unique identifiers, cryptographic keys, etc.

The network interface 206 may include an interface that can allow the server computer 200 to communicate with external computers. The network interface 206 may enable the server computer 200 to communicate data to and from another device (e.g., a request realization computer, an authorizing entity computer, a request originating computer, etc.). Some examples of the network interface 206 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 208 may comprise code, executable by the processor 204, for performing a method comprising: receiving, by a server computer, a data file comprising remittance data and payment data from a request realization computer, the remittance data associated with a request provided from a request originating computer to the request realization computer; generating, by the server computer, a unique identifier for the data file; providing, by the server computer, the payment data and the unique identifier to an authorizing entity computer requesting payment on behalf of the request realization computer, wherein the authorizing entity computer, upon authorizing the request associated with the payment data, provides payment data and the unique identifier to the request originating computer; and providing, by the server computer, the remittance data and the unique identifier to the request originating computer, wherein the request originating computer compares the unique identifier received from the authorizing entity computer and the unique identifier received from the server computer and updates a repository using the payment data and the remittance data upon finding a match.

The computer readable medium 208 may comprise a number of software modules including, but not limited to, a communication module 208A, an encryption module 208B, a data management module 208C, a validation module 208D, and an access portal module 208E.

The communication module 208A may comprise code that causes the processor 204 to generate messages, forward messages, receive messages, reformat messages, and/or otherwise communication with other entities. The communication module 208A may allow the server computer 200 to interact with other entities through various APIs or other means of communication. For example, the communication module 208A may allow the server computer 200 to receive a data file (e.g., via file-based integration, a dedicated API, etc.) comprising request data and payment data from a request realization computer. The communication module 208A may allow the server computer 200 to provide the payment data and the unique identifier to an authorizing entity computer requesting payment on behalf of the request realization computer. The communication module 208A may further allow the server computer 200 to provide the remittance data and the unique identifier to a request originating computer.

The encryption module 208B may include any suitable encryption/decryption algorithms to encrypt data and/or messages in embodiments. A suitable encryption/decryption algorithm may include DES, triple DES, AES, etc. The encryption module 208B may store encryption keys that can be used with such encryption/decryption algorithms. The encryption module 208B may utilize symmetric or asymmetric encryption techniques to encrypt and/or verify data. Cryptographic keys that may be used by the encryption/decryption module 208B may be securely stored in the memory 202.

The data management module 208C may comprise code that causes the processor 204 to manage data stored by the server computer 200 or a database associated with the server computer 200 (e.g., the second database 108 linked to the server computer 106). The data management module 208C may receive, from the communication module 208A, the data file comprising payment data and remittance data and store the data file in, for example, the database. The data file may be stored for a predetermined amount of time. The data management module 208C may periodically check if the predetermined amount of time has elapsed, if the predetermined amount of time for a data file has elapsed, the data file may be expunged from storage (e.g., the data stored in a database may be automatically deleted after the predetermined amount of time has passed). The data management module 208C may assign a unique identifier to the data file. The unique identifier may be generated by the data management module 208C. In some embodiments, the data management module 208C may generate the unique identifier using any suitable random and/or pseudo-random number generators. In other embodiments, the data management module 208C may store a plurality of unique identifiers in a unique identifier database, wherein the server computer 200 can select a unique identifier from the plurality of unique identifiers to be associated with the data file. In yet other embodiments, the data management module 208C can allow the server computer 200 to incrementally assign unique identifiers to data files.

The validation module 208D may comprise code that can cause the processor 204 to validate codes or data. In some embodiments, the validation module 208D may validate a data file (e.g., an encrypted data file) received from a request realization computer. For example, the validation module 208D can validate the remittance data and the payment data received from the request realization computer. The validation module 208D can determine an inaccuracy in the data file and generate an error message identifying the inaccuracy in the data file. The validation module 208D can generate an error for a single transaction from a data file comprising a plurality of transactions.

The access portal module 208E may comprise code that can cause the processor 204 to establish and maintain an access portal. The access portal may accept data (e.g. payment data and/or remittance data) that can be uploaded by a request realization computer, for example, in form of a data file. The payment data and/or remittance data may be uploaded through file-based integration, dedicated API, or through a form provided by the access portal. The access portal may be in operative communication with the memory 202 to store and access payment data and remittance data. The access portal may provide access to the payment data and remittance data to an entity (e.g., the request realization computer 102, the request originating computer 110). A unique identifier may be received from an entity (e.g., the request realization computer 102, the request originating computer 110) to access to the payment data and remittance data associated with the unique identifier. Access to the payment data and remittance data may require the entity be associated with the data (e.g., the entity requesting access to the data may be a buyer, associated with the request realization computer, which may be named in the payment data and/or remittance data).

In some embodiments, the server computer 200 can be in an electronic system used to accept, transmit, or process transactions made by user devices for money, goods, services or access to locations or data. The server computer 200 may transfer information and funds among issuers, acquirers, transacting parties, and users. An example of the transaction processing network may include a payment processing server computer such as VisaNet™, operated by Visa®. Payment processing server computers such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. In other embodiments, a transaction processing network can be a collection of computers that can allow access to a person seeking to access a particular location. In yet other embodiments, a transaction processing network can be a collection of computers that can allow access to specific types of data (e.g., governmental agencies).

Figure 3:
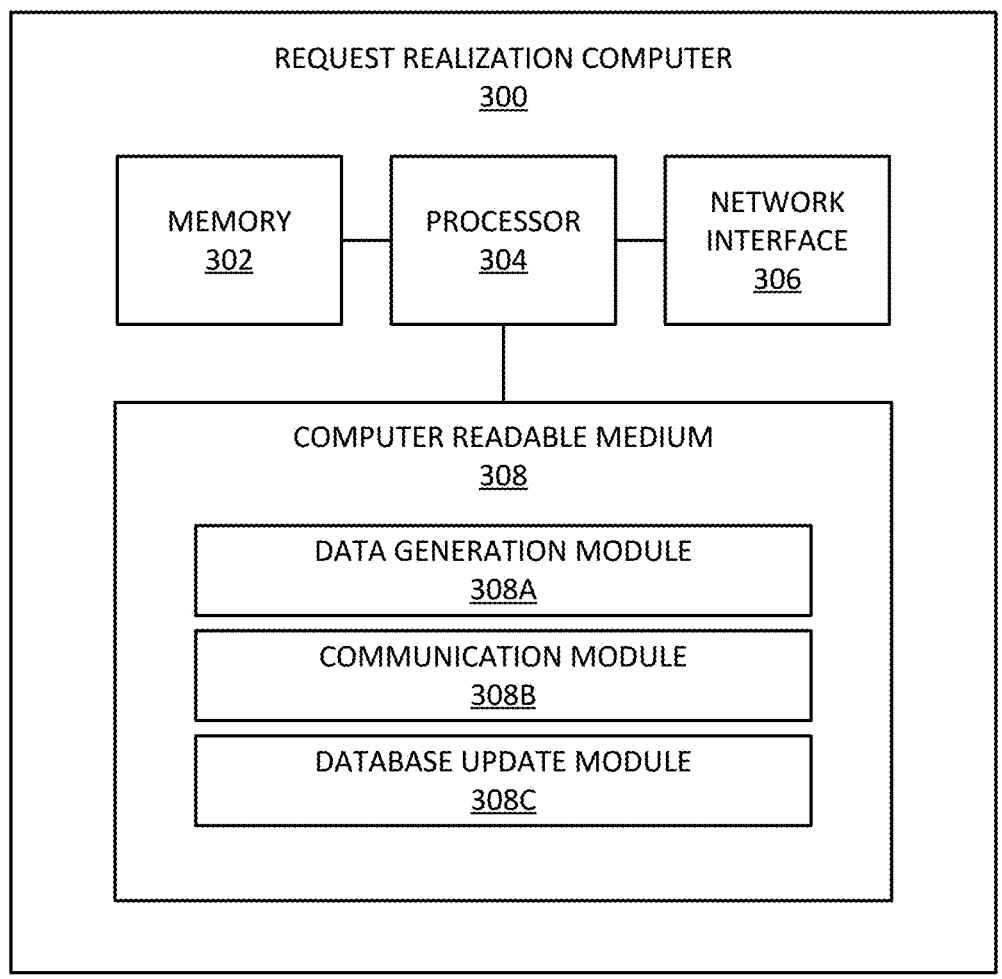
FIG. 3 shows a block diagram of components of a request realization computer according to embodiments.

FIG. 3 shows a block diagram of components of a request realization computer 300 according to embodiments. The request realization computer 300 may comprise a processor 304. The processor 304 may be coupled to a memory 302, a network interface 306, and a computer readable medium 308. The computer readable medium 308 can comprise any suitable number of modules.

The memory 302 can be used to store data and code. The memory 302 may be coupled to the processor 304 internally or externally (e.g., cloud-based data storage), and may comprise any combination of volatile and/or non-volatile memory, such as RAM, DRAM, ROM, flash, or any other suitable memory device. For example, the memory 302 can store data files comprising remittance data and payment data, unique identifiers, cryptographic keys, etc.

The network interface 306 may include an interface that can allow the request realization computer 300 to communicate with external computers. The network interface 306 may enable the request realization computer 300 to communicate data to and from another device (e.g., a first database, a server computer, a request originating computer, etc.). Some examples of the network interface 306 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 306 may include Wi-Fi™. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 308 may comprise a number of software modules including, but not limited to, a data generation module 308A, a communication module 308B, and a database update module 308C. The computer readable medium 308 may further comprise other modules such as an encryption module similar to the encryption module 208B of the server computer 200.

The data generation module 308A may comprise code that causes the processor 304 to generate payment data file and remittance data file from a received invoice. The generated payment data file and remittance data file may be in a standard format defined by a server computer.

The communication module 308B may comprise code that causes the processor 304 to generate messages, forward messages, reformat messages, and/or otherwise communication with other entities. The communication module 308B may transmit the payment data file and remittance data file to a server computer (e.g., via file-based integration or an API).

The database update module 308D may comprise code that causes the processor 304 to update a database (e.g., the first database 104 linked to the request realization computer 102). The database may be updated to store any suitable information. For example, the database can store an invoice received by a request originating computer.

Figure 4:
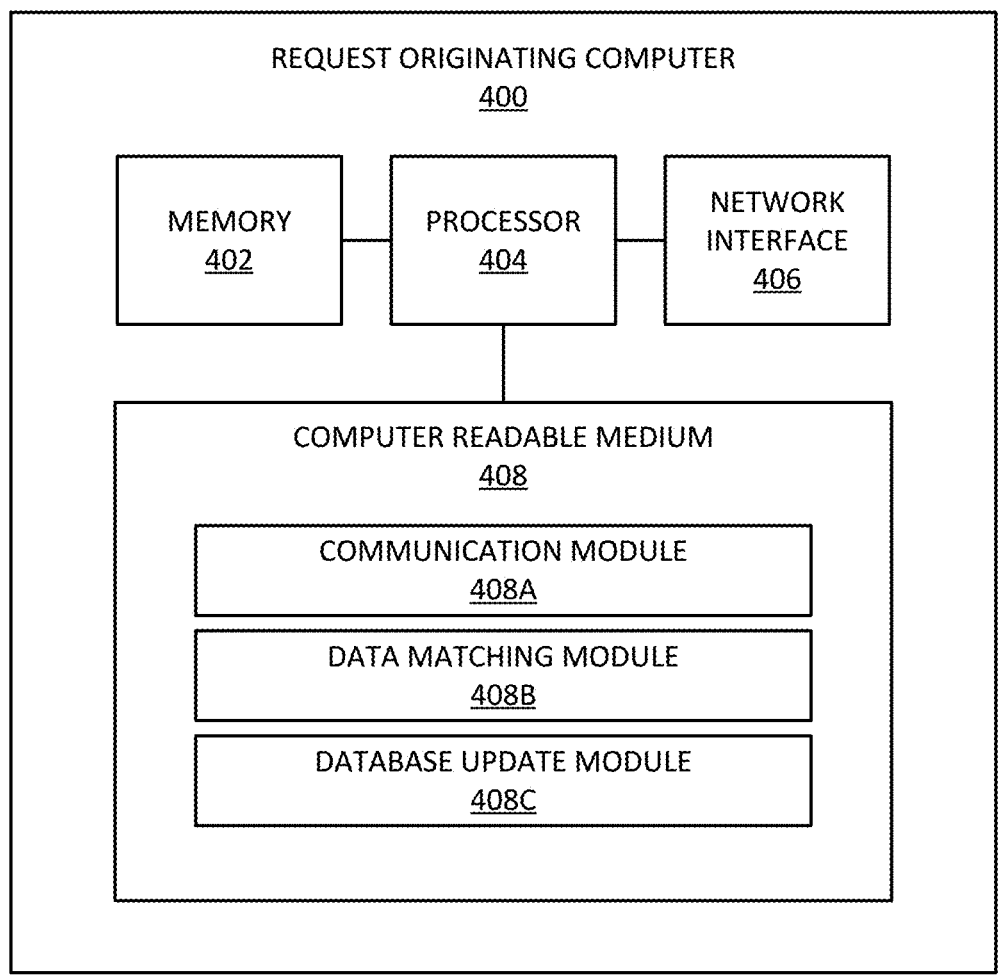
FIG. 4 shows a block diagram of components of a request originating computer according to embodiments.

FIG. 4 shows a block diagram of components of a request originating computer 400 according to embodiments. The request originating computer 400 may comprise a processor 404. The processor 404 may be coupled to a memory 402, a network interface 406, and a computer readable medium 408. The computer readable medium 408 can comprise any suitable number of modules.

The memory 402 can be used to store data and code. The memory 402 may be coupled to the processor 404 internally or externally (e.g., cloud based data storage), and may comprise any combination of volatile and/or non-volatile memory, such as RAM, DRAM, ROM, flash, or any other suitable memory device. For example, the memory 402 can store data files comprising remittance data and payment data, unique identifiers, cryptographic keys, etc.

The network interface 406 may include an interface that can allow the request originating computer 400 to communicate with external computers. The network interface 406 may enable the request originating computer 400 to communicate data to and from another device (e.g., a request realization computer, a server computer, a third database, etc.). Some examples of the network interface 406 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 406 may include Wi-Fi™. Data transferred via the network interface 406 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 406 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 408 may comprise a number of software modules including a communication module 408A, a data matching module 408B, and a database update module 408C. The computer readable medium 408 may further comprise other modules such as an encryption module similar to the encryption module 208B of the server computer 200.

The communication module 408A may comprise code that causes the processor 404 to generate messages, forward messages, reformat messages, and/or otherwise communication with other entities. For example, the communication module 408A may allow the request originating computer to transmit an invoice to a request realization computer. The communication module 408A may further allow the request originating computer 400 to receive, from a server computer, a remittance data file and a unique identifier. The communication module 408A may additionally allow the request originating computer 400 to receive, from a transport computer associated with an authorizing entity computer, a payment data file and the unique identifier.

The data matching module 408B may comprise code that causes the processor 404 to match data files associated with unique identifiers, that may be received from different entities. For example, the data matching module 408B may match a payment data file associated with a unique identifier received from an authorizing entity (e.g. bank) to a remittance data file associated with the same unique identifier received from the server computer.

The database update module 408D may comprise code that causes the processor 404 to update a database (e.g., the third database 112 linked to the request originating computer 110). For example, the database update module 408D may be configured to store the payment data file and the remittance data file along with the associated unique identifier at the database.

Figure 5:
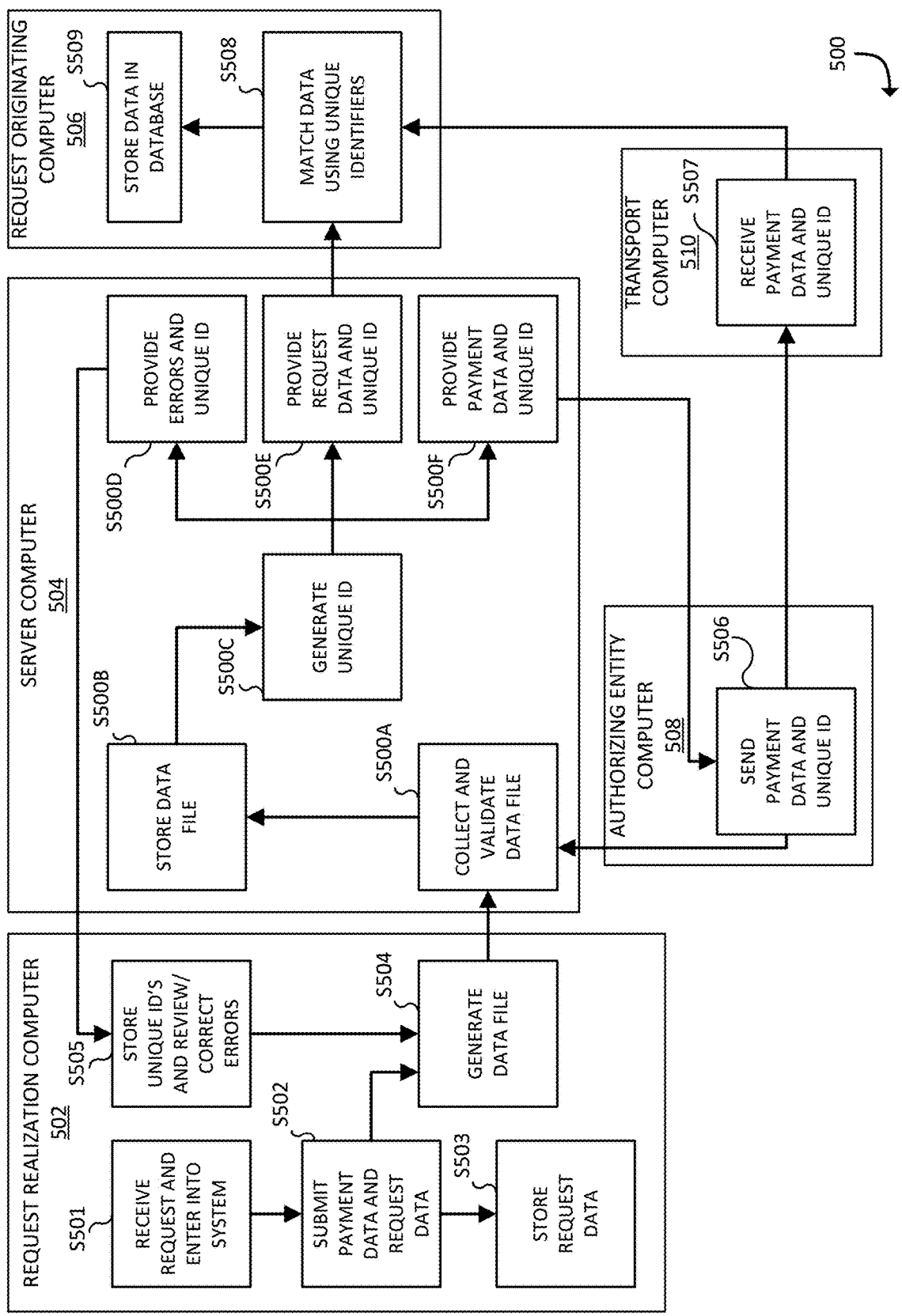
FIG. 5 shows a flow diagram illustrating a request method according to embodiments.

FIG. 5 shows a flow diagram illustrating a request method according to embodiments. The method illustrated in FIG. 5 will be described in the context of a request originating computer 506 operated by a supplier requesting payment for an invoice from a request realization computer 502 operated by a buyer. It is understood, however, that embodiments can be applied to other circumstances. For example, the request originating computer a can request a data item from the request realization computer 502. The requested data item can include, for example, access to a secure webpage, access to a building, a dataset, etc. Embodiments can be applicable across electronic payment methods (e.g., ACH, wire, card, B2B Connect, etc.).

At step S501, the request realization computer 502 can receive a request (e.g., an invoice) from the request originating computer 506. The request realization computer 502 can enter the request into a list of pending and/or current requests. For example, the request realization computer 502 can store the received invoice into a list of invoices. The request realization computer 502 can receive a request from one of a plurality of request realization computers 502 (e.g., a plurality of computers all operated by a single entity) and store the requests received into a list associated with the plurality of request realization computers 502.

At any suitable point in time thereafter, at step S502, the request realization computer 502 can submit the request for realization (e.g., submit the invoice for payment). At step S503, the request realization computer 502 can store invoice and/or payment submission data into a database (e.g., the first database 104 illustrated in FIG. 1).

At step S504, the request realization computer 502 can generate a data file comprising payment data and remittance data (e.g., invoice data). The payment data can comprise receiving bank account information, sending bank account information, amounts, dates, times, and/or any other suitable data that facilitates in transferring funds from one institution to a second institution. The remittance data can comprise data relating to the request, for example, a request number, a subject of the request, etc. In some embodiments, the request can be an invoice and the remittance data can be invoice data comprising an invoice number, an invoice amount, a buyer name, a short pay reason, a supplier bank information, and/or any other data that facilitates in describing the invoice. In some embodiments, the data file may be a basic file, a file with header trailer and different record types, a CSV and excel format type, etc. In some embodiments, the data file can be generated such that it can be read by the server computer 504. For example, the data file can have a format which is readable and/or decipherable by the server computer 504. The data file can comply with any suitable standards. In some embodiments, the data file can comprise payment data and remittance data that corresponds to one or more than one request. For example, the data file can comprise payment data corresponding to two or more invoices. The data file comprising both the remittance data and the payment data allows for a format that can include several transactions from different banks and electronic payment methods.

The request realization computer 502 can then provide the data file to the server computer 504. The request realization computer 502 can transmit the data file in any suitable manner, for example, an API or file-based transfer protocol, but is not limited thereto. In some embodiments, the data file can be encrypted such that the server computer 504 can decrypt the data file.

Between steps S504 and S505, the server computer 504 can perform any suitable processing. For example, the server computer 504 can perform steps S500A, S500B, S500C, S500D, S500E, and/or S500F prior to step S505. In some embodiments, steps S500E and S500F can be performed after step S505.

At step S500A, the server computer 504 can collect and validate the data file. For example, the validation process can determine whether the received data file is of a correct format and/or comprises the correct data and data fields. The server computer 504 can capture the payment data and remittance data, run validations on the format and integrity of the data.

In some embodiments, if the server computer 504 determines that one or more errors are present in the data file, then the server computer 504 can transmit an error message to the request realization computer 502 indicating that the data file includes one or more errors. The server computer 504 may identify an error in a portion of the data relating to one transaction from a data file comprising a plurality of transactions. In some embodiments, the server computer 504, after determining that one or more errors are present, can perform steps S500B and S500C, prior to providing the error message to the request realization computer 502. As a response to the list of one or more errors, the server computer 504 may receive an updated data file from the request realization computer 502. The server computer 504 may then validate the updated payment data and/or the updated remittance data. If no errors are then found in the updated data, the server computer 504 may proceed with further processing. If an error is identified in one transaction from a data file comprising a plurality of transactions, the server computer 504 may provide the error message to the request realization computer 502 in the manner described above and proceed with the validation and processing of the remaining error-free, validated transactions.

At step S500B, after validating the data file, the server computer 504 can store the data file in a secure memory and/or a secure database (e.g., the second database 108 illustrated in FIG. 1). In some embodiments, the server computer 504 can re-format the data file and store the re-formatted data file in a database. The server computer 504 may store the data file for any suitable amount of time.

At step S500C, the server computer 504 can generate a unique identifier. For example, the server computer 504 generate the unique identifier using any suitable random and/or pseudo-random number generators. In other embodiments, the server computer 504 can select a unique identifier to assign to the data file from a plurality of unique identifiers from a unique identifier database. In yet other embodiments, the server computer 504 can incrementally assign unique identifiers to incoming data files. For example, storing the data file (or the corrected data file if the request realization computer returns a corrected data file correcting any errors identified by the server computer) at the secure database may trigger the generation of the unique identifier. By assigning the unique identifier to the data file and storing the unique identifiers and data files, the server computer 504 can create a repository over time of remittance data linked to each payment data. In some embodiments, the server computer 504 can generate a unique identifier for data files that are determined to include one or more errors. In other embodiments, the server computer 504 may not generate a unique identifier for data files that are determined to include one or more errors.

In some embodiments, the server computer 504 can also generate a timestamp along with the unique identifier. The timestamp may be included with the unique identifier in subsequent messages. The timestamp may be used by the server computer 504 to determine when the data file can be removed from storage.

At step S500D, after generating the unique identifier, the server computer 504 can provide the unique identifier to the request realization computer 502, along with one or more of the payment data and the remittance data such that the request realization computer 502 can match the unique identifier with the corresponding data. In some embodiments, if one or more errors are determined, the server computer 504 can provide the one or more errors to the request realization computer 502 along with the unique identifier.

At step S505, after receiving at least the unique identifier from the server computer 504, the request realization computer 502 can store the unique identifier. In some embodiments, if the request realization computer 502 also receives a list of one or more errors, then the request realization computer 502 can correct the one or more errors. The request realization computer 502 can then repeat step S504 and provide an updated (an error corrected) data file to the server computer 504 for further processing.

At step S500E, after generating the unique identifier and successfully validating the remittance data, the server computer 504 can provide the unique identifier and the remittance data to the request originating computer 506. In some embodiments, the server computer 504 can provide the remittance data and the unique identifier to the request originating computer 506 using an API or other suitable file-based communication protocol.

At step S500F, after generating the unique identifier and successfully validating the payment data, the server computer 504 can provide the unique identifier and the payment data to the authorizing entity computer 508. In some embodiments, the server computer 504 can provide payment data to a plurality of authorizing entity computers. For example, the payment data received from the request realization computer 502 can include payment data indicating to utilize different accounts maintained by different authorizing entities. In some embodiments, steps S500D, S500E, and S500F can be performed in any order or concurrently.

At step S506, the authorizing entity computer 508 can determine whether or not to authorize the transaction. For example, if the payment is not authorized, then the authorizing entity computer 508 can transmit an error message to the server computer 504 that indicates an error and/or an indication of why the payment is not authorized. If the payment is authorized, then the authorizing entity computer 508 can initiate and perform a payment to the transport computer 510. The transport computer 510 can maintain an account associated with the request originating computer 506. Further, the authorizing entity computer 508 can provide the unique identifier along with payment processing information to the transport computer 510.

At step S507, the transport computer 510 can receive the payment from the authorizing entity computer 508 that maintains an account associated with the request realization computer 502. The transport computer 510 can also receive the unique identifier. The transport computer 510 can provide an indication or confirmation of the transaction as well as the unique identifier to the request originating computer 506.

At step S508, after receiving the remittance data and the unique identifier from the server computer 504 and the payment confirmation and the unique identifier from the transport computer 510, the request originating computer 506 can match the payment confirmation with the remittance data (e.g., the invoice data). In some embodiments, for example, the request originating computer 506 can store the unique identifier and the remittance data until the payment is posted (or longer) and may then receive the alert from the transport computer 510 when payment is cleared and searches for unique identifier in its database for matching. In some embodiments, the request originating computer 506 can perform any suitable validations to match payment data and remittance data.

At step S509, the request originating computer 506 can store any suitable information, for example, the payment confirmation, the request, the remittance data, etc. in a database.

The majority of current systems link remittance data to payment data manually, increasing the cost of operations for the supplier operating the request originating computer 506. Aside from cost, the linking data manually creates additional inefficiencies in the time spent to link the data. For example, if there are errors in the payment process (e.g., a short pay), the supplier would need to communicate with the buyer to understand the reason. Communication (e.g., the process of receiving the remittance data) between the supplier and buyer may be done through different channels (e.g., email, portals, calling the buyer), requiring the supplier to have the capabilities and previous agreements on which communication channel to use with the buyer. Aside from logistic concerns, privacy concerns may arise in these situations relating to which communication channel is chosen. A buyer's preferred communication channel may not satisfy privacy needs of transmitting sensitive payment data and remittance data. In addition, the buyer has several pain points in current systems. After receiving an invoice from the supplier, the payment data file and the remittance data files are generated separately by the buyer. The payment data file generated is dependent on the supplier, placing a burden on the buyer to have the ability to generate a large amount of different payment data file formats. Many formats defined by the supplier only allow limited or no remittance data to be included. Further, as only the payment data file is validated, a large portion of the remittance data may go unchecked for integrity or errors.

Embodiments of the disclosure have a number of advantages. For example, embodiments provide for linking of remittance data to payment data. The remittance data file and payment data file are linked by the server computer 504 (throughout the central hub system) through the use of the unique identifier generated in step S500C. Further, embodiments provide for the ease of submitting invoice payments by the request realization computer due to, at least, the acceptance of data files via widespread APIs and format standardizations of the server computer 504. The standard format set by the server computer 504 can include several transactions from different banks and payment methods. Additionally, it lowers the costs associated with maintaining several different data file formats (e.g., the buyer receives only one payment data file comprising all payment data information instead of several files of different formats from different banks, and similarly for the receiver). The unique identifier may be used by either the buyer or the supplier in various ways. For example, the unique identifier may be used by the buyer to track the payment and provide remittance data to the supplier. The unique identifier may be used by the supplier to access remittance data through a single file, no longer requiring a variety of communication channels. The unique identifier may be used to access the payment data and/or remittance data via an access portal (e.g., the access portal created by the access portal module 208F). A buyer or receiver may use the unique identifier to securely access the payment data and/or remittance data associated with the unique identifier. The access portal may grant access to the data via file-based integration or a dedicated API. Overall, embodiments of the disclosure ease various pain points caused by the plurality of payment data file formats and manual linkage of the payment data and remittance data.

Although the steps in the flowcharts and process flows described above are illustrated or described in a specific order, it is understood that embodiments may include methods that have the steps in different orders. In addition, steps may be omitted or added and may still be within embodiments.

Figure 6:
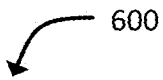
FIG. 6 shows a chart illustrating invoice data passed in a payment.

FIG. 6 shows a chart illustrating invoice data passed received during a payment. The chart 600 is an example of invoice data received by the request realization computer in step S501 of FIG. 5. Additionally, the example data found in the FIELD column 602 and the VALUE column 604 may be included in the data file generated in step S504 of FIG. 5. The data file may comprise invoice data (e.g., an invoice number, invoice currency type, and an amount), information associated with the buyer (e.g., an identifier associated with the buyer), information associated with the supplier (e.g., the name of the supplier, contact information of the supplier such as a phone number associated with the supplier, the location of the supplier), and any other relevant payment details (e.g., a description of the good(s) or service(s) being provided by the supplier to the buyer, a payment due date). Chart 600 additionally includes a source column 606 indicating the source of the corresponding data element in data field column 602 and a destination column 608 indicating the destination of the data element in data field column 602. The designation "AR" (accounts receivable) may correspond to the request originating computer 506 of FIG. 5, the designation "AP" (accounts payable) may correspond to the request realization computer 502 of FIG. 5, and the designation "BANK" may correspond to the authorizing entity computer 508 of FIG. 5. The data fields included in 602 are illustrative and do not represent all of the data that is to be included.

Figure 7A:
FIG. 7A shows a chart illustrating payment data elements and remittance data elements included in a single invoice, single payment transaction between a supplier and a buyer linked by a unique identifier.

FIG. 7A shows a chart 702 illustrating payment data elements and remittance data elements included in a single invoice, single payment transaction between a supplier and a buyer linked by a unique identifier. The remittance data may include an invoice number, an invoice amount, and an invoice currency. The remittance data may be linked to the payment data with a unique identifier (e.g., the unique identifier generated in step S500C of FIG. 5). The payment data may include the total payment amount, payment currency, and a short pay code. The short pay code may be an alphanumeric character with a definition predetermined (e.g., some examples of short pay codes include: 0—full amount was paid, 9—discount was applied, a—buyer unable to pay full invoice, etc.) between the buyer and receiver. Chart 702 shows an invoice #1234 for 1000 USD being linked, via unique identifier 9999, to a payment of 1000 USD. The short pay code is shown as 0, which may represent no short pay was involved (e.g., the full amount was paid).

Figure 7B:
FIG. 7B shows a chart illustrating payment data elements and remittance data elements included in a multiple invoice, same currency payment transaction between a supplier and a buyer linked by a single unique identifier.

FIG. 7B shows a chart 704 illustrating payment data elements and remittance data elements included in a multiple invoice, same currency payment transaction between a supplier and a buyer linked by a single unique identifier. The payment data and remittance data may correspond to one or more invoices. Rows of the chart may correspond to a single invoice. In addition to the columns seen in chart 702, the chart 704 may include a column indicating the amount paid for each of the invoices. The row corresponding to invoice #7890 shows a short pay code 9—DISCOUNT, which may indicate a discount was applied to the item corresponding to the invoice and so the invoice amount and invoice payment amount will not be equal.

Figure 8:
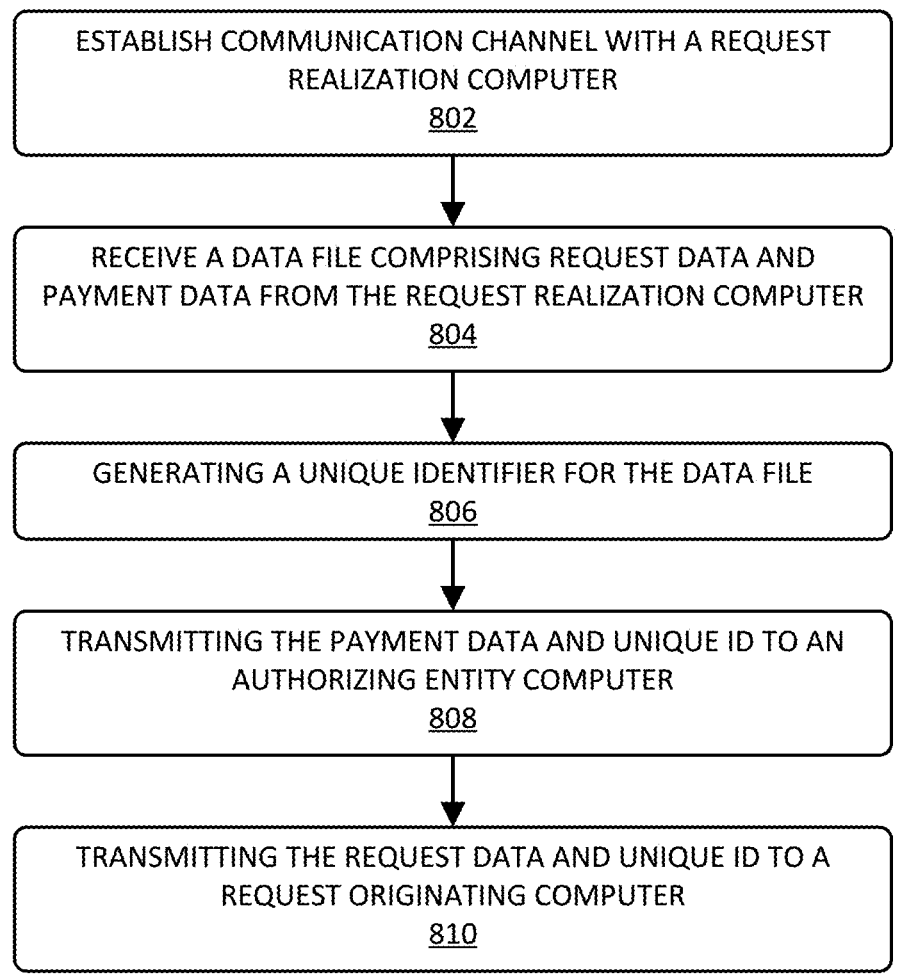
FIG. 8 shows a process flow for a request method according to embodiments.

FIG. 8 shows an example process 800 for linking remittance data and payment data to a unique identifier via a server computer according to embodiments. The process 800 is illustrated as a logical flow diagram, each operation of which represent a sequence of operations that can be implemented in hardware, computer instructions, or a combination thereof. In the context of computer instructions, the operations represent computer-executable instructions stored on one or more computer-readable storage media (e.g., the computer readable medium 208 of the server computer 200) that, when executed by one or more processors, perform the recited operations.

At 802, a communication channel is established between the server computer and a request realization computer. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

At 804, the server computer may receive a data file comprising remittance data and payment data from the request realization computer. The remittance data may be an invoice, and the remittance data can be invoice data (e.g., an invoice number, an invoice amount, etc.). The payment data may comprise receiving bank account information, sending bank account information, amount transferred, dates, times, and any other suitable data that facilitates a transfer of funds. The data file may be of any suitable format readable by the server computer that stores the remittance data and payment data. The data file can have a format which is defined by the operator of the server computer. In some embodiments, the data file may comprise payment data and remittance data that corresponds to one or more than one request. The one or more than one request may originate from a plurality of request originating computers operated by a single entity.

At 806, the server computer may generate a unique identifier for the data file. The unique identifier may be generated using any suitable random and/or pseudo-random number generator. In other embodiments, the server computer can select a unique identifier to assign to the data file from a plurality of unique identifiers from a unique identifier database. In yet other embodiments, the server computer can incrementally assign unique identifiers to incoming data files. The server computer may then associate the unique identifier with the data file and store the unique identifier along with the data file. In some embodiments, the server computer may store the data file an associated unique identifier for a time period. Further, the server computer may expunge the data after the time period has elapsed. In some embodiments, the data file may first be validated by the server computer. The validation may check for any errors in the data file and the server computer may request a request realization computer to correct the errors before associating the unique identifier to the data file. In some embodiments, the error may be found in a data file comprising a plurality of transactions. The error may be in one transaction of the plurality of transactions. The server computer may request the request realization computer to correct the error identified and proceed with further processing of the remaining plurality of transactions.

At 808, the server computer may transmit the payment data associated unique identifier to an authorizing entity computer. In some embodiments, the server computer can send payment data and corresponding unique identifiers to a plurality of authorizing entity computers. For example, when the data file comprises payment data and remittance data from more than one request, the payment data may indicate to utilize different accounts maintained by different authorizing entities.

At 810, the server computer may transmit the remittance data associated with the unique identifier to a request originating computer. In some embodiments, the remittance data and unique identifier may be provided to the request originating computer via file-based integration, an API, etc. In other embodiments, the remittance data may be provided to the request originating computer through an access portal. The access portal may receive, from the originating computer, a unique identifier and provide access to the remittance data associated with the unique identifier.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations will become apparent to those skilled in the art upon review of the disclosure. The scope of the application should, therefore, be determined not with reference to the above description, but instead should be determined with reference to the pending claims along with their full scope or equivalents.

One or more features from any embodiment may be combined with one or more features of any other embodiment without departing from the scope of the application.

As used herein, the use of "a," "an," or "the" is intended to mean "at least one," unless specifically indicated to the contrary.

What is claimed is:

1. A method comprising:
   providing, by a server computer, an API to a request realization computer for establishing a secure communication channel between the server computer and the request realization computer;
   receiving, by a server computer, an encrypted data file from a request realization computer using the API previously provided by the server computer;
   decrypting, by the server computer, the encrypted data file using a decryption key stored by the server computer to obtain a data file comprising remittance data and payment data, wherein the remittance data is associated with a request provided from a request originating computer to the request realization computer, wherein the payment data includes a plurality of individual payment data associated with a plurality of authorizing entities;
   storing, by the server computer, the data file in a database, wherein storing the data file triggers generation of a unique identifier;
   generating, by the server computer, the unique identifier for the data file using a number generator, wherein the data file is associated with the unique identifier regardless of the remittance data and the payment data of the data file being associated with one or more transactions;
   validating, by the server computer, the remittance data and the payment data;
   determining, by the server computer, an inaccuracy in the data file;
   providing, by the server computer, the unique identifier and an error message identifying the inaccuracy in the data file to the request realization computer;
   receiving, by the server computer, corrected data file from the request realization computer;
   validating, by the server computer, the corrected data file;
   providing, by the server computer, confirmation of validation and the unique identifier to the request realization computer;
   storing, by the server computer, the corrected data file in the database;
   for each individual payment data:
      generating, by the server computer, a payment information file including the individual payment data and the unique identifier according to a format specification of a corresponding authorizing entity computer, wherein the unique identifier is inserted in a message field of the payment information file;
      providing, by the server computer, the payment information file including the individual payment data and the unique identifier to the corresponding authorizing entity computer requesting payment on behalf of the request realization computer, wherein the authorizing entity computer, upon authorizing the request associated with the individual payment data, provides the individual payment data and the unique identifier to the request originating computer;
      receiving, by the server computer, communication from the authorizing entity computer regarding processing of the individual payment data and the unique identifier;
   formatting, by the server computer, the remittance data into a reformatted remittance data based on a format specification of the request originating computer;
   providing, by the server computer, the reformatted remittance data and the unique identifier to the request originating computer,
   wherein the data file including the remittance data and the payment data is input to the server computer without the unique identifier, and all data related to the data file is output from the server computer with the unique identifier,
   progressively creating, by the server computer, a repository for linking each received remittance data to each received payment data based on communications of the server computer with (1) the request originating computer, (2) the request realization computer, and (3) the authorizing entity computer; and
   granting access, by the server computer, to the request realization computer, the request originating computer, and the authorizing entity computer to the repository using the unique identifier, wherein the access is limited to the data file associated with the unique identifier provided by the request realization computer or the request originating computer while remaining data in the repository is blocked from access.

2. The method of claim 1, wherein the authorizing entity computer provides the payment data and the unique identifier to the request originating computer via a transport computer.

3. The method of claim 1, wherein the server computer receives the data file from the request realization computer via a first API, and the server computer provides the remittance data and the unique identifier to the request originating computer via a second API.

4. The method of claim 1, further comprising:
expunging, by the server computer, the data file from the database upon determining that a predetermined amount of time has passed.

5. The method of claim 1, wherein the data file includes remittance data and payment data associated with a plurality of transactions between the request originating computer and the request realization computer.

6. The method of claim 1, further comprising:
providing, by the server computer, the remittance data and the unique identifier to the request originating computer in a file including other remittance data and unique identifiers associated with a plurality of transactions associated with a plurality of request originating computers.

7. A server computer comprising:
a processor; and
a computer readable medium coupled to the processor, the computer readable medium comprising code that, when executed by the processor, cause the processor to;
provide an API to a request realization computer for establishing a secure communication channel between the server computer and the request realization computer;
receive an encrypted data file from a request realization computer using the API previously provided by the server computer;
decrypt the encrypted data file using a decryption key stored by the server computer to obtain a data file comprising remittance data and payment data, wherein the remittance data is associated with a request provided from a request originating computer to the request realization computer, wherein the payment data includes a plurality of individual payment data associated with a plurality of authorizing entities;
store the data file in a database, wherein storing the data file triggers generation of a unique identifier;
generate the unique identifier for the data file using a number generator, wherein the data file is associated with the unique identifier regardless of the remittance data and the payment data of the data file being associated with one or more transactions;
validate the remittance data and the payment data;
determine an inaccuracy in the data file;
provide the unique identifier and an error message identifying the inaccuracy in the data file to the request realization computer;
receive corrected data file from the request realization computer;
validate the corrected data file;
provide confirmation of validation and the unique identifier to the request realization computer;
store the corrected data file in the database;
for each individual payment data:
generate a payment information file including the individual payment data and the unique identifier according to a format specification of a corresponding authorizing entity computer, wherein the unique identifier is inserted in a message field of the payment information file;
provide the payment information file including the individual payment data and the unique identifier to the corresponding authorizing entity computer requesting payment on behalf of the request realization computer, wherein the authorizing entity computer, upon authorizing the request associated with the individual payment data, provides the individual payment data and the unique identifier to the request originating computer;
receive communication from the authorizing entity computer regarding processing of the individual payment data and the unique identifier;
format the remittance data into a reformatted remittance data based on a format specification of the request originating computer;
provide the reformatted remittance data and the unique identifier to the request originating computer,
wherein the data file including the remittance data and the payment data is input to the server computer without the unique identifier, and all data related to the data file is output from the server computer with the unique identifier,
progressively create a repository for linking each received remittance data to each received payment data based on communications of the server computer with (1) the request originating computer, (2) the request realization computer, and (3) the authorizing entity computer, and
grant access to the request realization computer, the request originating computer, and the authorizing entity computer to the repository using the unique identifier, wherein the access is limited to the data file associated with the unique identifier provided by the request realization computer or the request originating computer while remaining data in the repository is blocked from access.

8. The server computer of claim 7, wherein the code, when executed by the processor, further causes the processor to:
store the data file as being associated with the unique identifier at the database for a predetermined amount of time, wherein the data file is automatically removed from the database when the predetermined amount of time has passed.

9. The server computer of claim 7, wherein the data file includes remittance data and payment data associated with a plurality of transactions between the request realization computer and, a plurality of request originating computers.

* * * * *